United States Patent [19]
Keith

[11] Patent Number: 5,676,486
[45] Date of Patent: Oct. 14, 1997

[54] CORNER ANGLE CONNECTOR

[75] Inventor: Edward L. Keith, Gig Harbor, Wash.

[73] Assignee: APA-The Engineered Wood Association, Tacoma, Wash.

[21] Appl. No.: 561,839

[22] Filed: Nov. 22, 1995

[51] Int. Cl.$^6$ ............................................. F16B 5/06
[52] U.S. Cl. ..................... 403/231; 403/205; 403/403; 248/300
[58] Field of Search .................... 403/231, 230, 403/205, 403, 402, 401, 265, 266, 267, 405.1–407.1; 52/282.1, 282.2; 248/220.1, 300

[56] References Cited

U.S. PATENT DOCUMENTS

| | | | |
|---|---|---|---|
| 622,118 | 3/1899 | Chase | 403/231 X |
| 1,336,193 | 4/1920 | Bryan | 403/231 X |
| 1,805,742 | 5/1931 | Reynolds | 248/300 X |
| 1,816,060 | 7/1931 | Stack | 403/205 |
| 2,084,758 | 6/1937 | Anderson | 403/231 |
| 2,379,179 | 6/1945 | Petersen | 52/282.1 |
| 2,753,141 | 7/1956 | Weber | 248/300 X |
| 3,343,329 | 9/1967 | Pohutsky | 248/300 X |
| 4,383,397 | 5/1983 | Ward | 403/231 X |
| 4,477,201 | 10/1984 | Yoshiyuji | 403/231 |
| 4,645,374 | 2/1987 | Erickson et al. | 403/403 X |
| 4,712,942 | 12/1987 | Brown | 403/231 X |
| 4,840,440 | 6/1989 | Dieter | 403/403 X |
| 4,893,773 | 1/1990 | Fujimoto | 248/300 X |

FOREIGN PATENT DOCUMENTS

| | | |
|---|---|---|
| 580254 | 9/1946 | United Kingdom . |
| 1081423 | 8/1967 | United Kingdom ............. 52/282.2 |

*Primary Examiner*—Harry C. Kim
*Attorney, Agent, or Firm*—Graybeal Jackson Haley LLP

[57] ABSTRACT

The present invention is a one-piece corner connector for structurally interconnecting in angular relation to each other two flat panels of a given thickness. The connector has a first connector sidewall oriented at an angle to a second connector sidewall. The connector also has a reinforcing tab which in relation with the first and second connector sidewalls forms a pair of channels into which rectangular panels are placed edgewise with each side face of each said panel engaged by either a connector sidewall or a reinforcing tab sidewall. Both side surfaces of each rectangular panel are secured to the corner connector using screws, nails, nuts and bolts, or an adhesive.

6 Claims, 1 Drawing Sheet

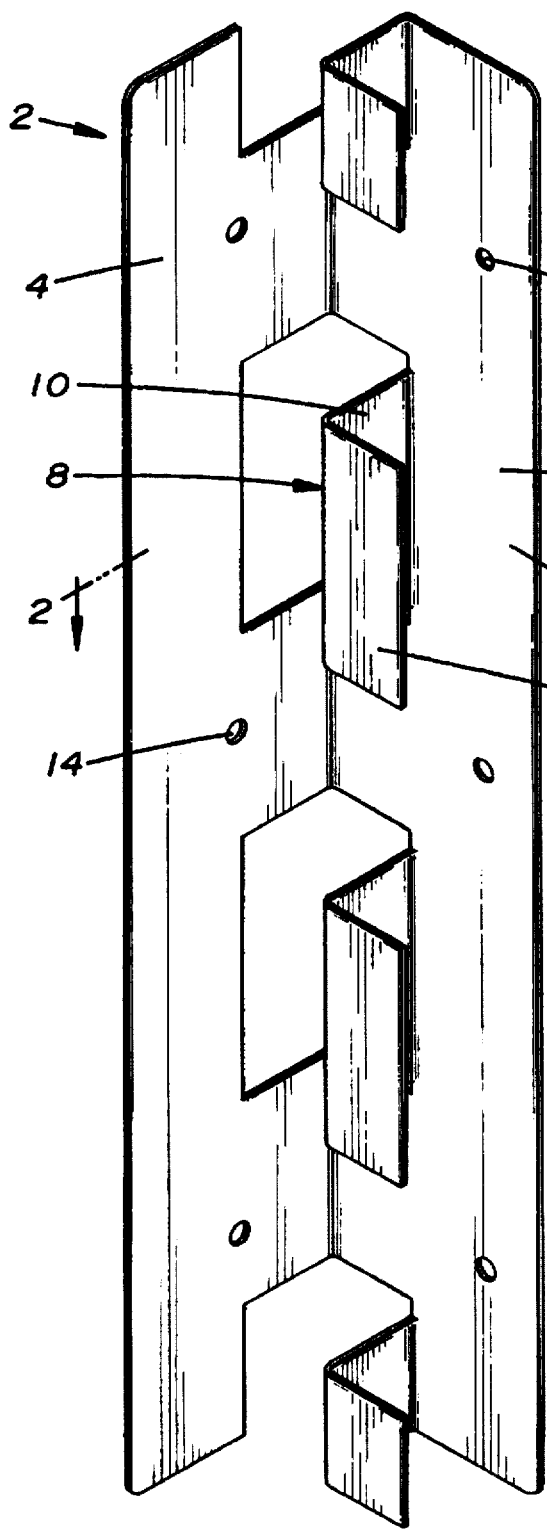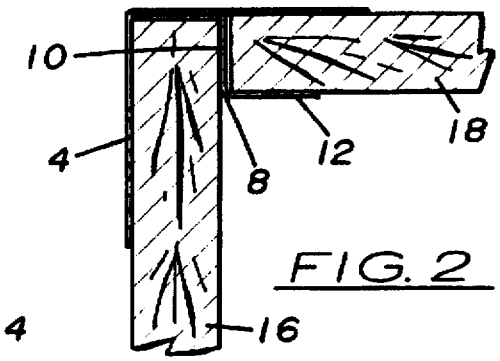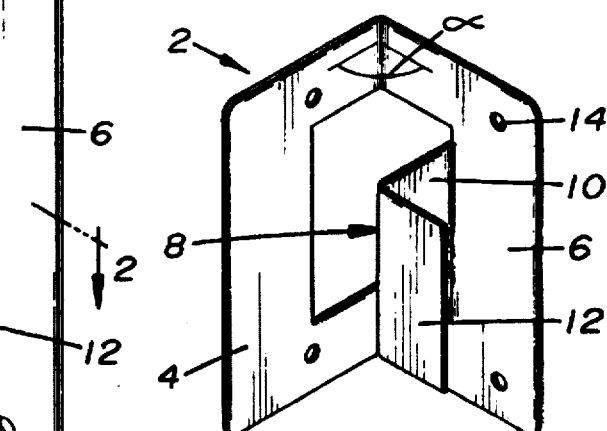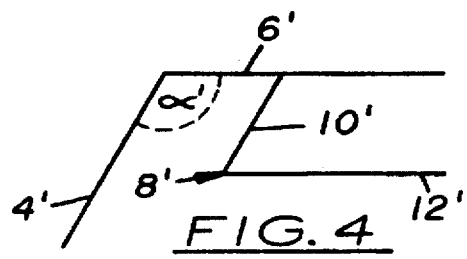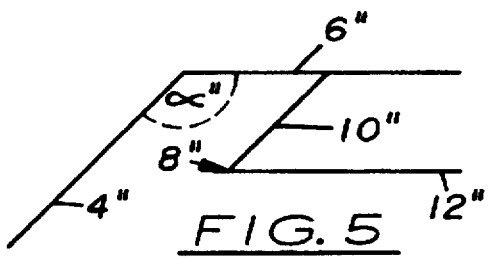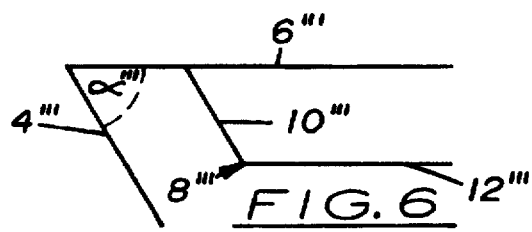

CORNER ANGLE CONNECTOR

FIELD OF THE INVENTION

The field of the invention relates generally to a structural reinforcement, and specifically to a corner angle connector for joining and reinforcing rectangular panels.

BACKGROUND OF THE INVENTION

It is often necessary to reinforce the connection between two rectangular panels. Whether the panels are made of wood, plywood, oriented strand board, particle board, drywall, or foam, the joint created when two panels are joined is often the weakest point in a structure. The joint is often subjected to a greater concentration of forces than any other part of the structure. Numerous prior art techniques have been developed for joining and reinforcing the corner connection of two or more rectangular panels.

It is often the practice to place a block or support strut at the corner of a joint in order to provide structural reinforcement as well as to facilitate the joining of the two pieces. While superior to a simple butt joint, this solution is not always desirable as it provides support only on the interior corner of the panels being joined and is secured to only one surface of each of the panels.

The prior art also includes a wide variety of joinery techniques beyond simple block joints and support struts. Dado, lap, rabbet, dovetail, and mortise and tenon joints all provide methods of joining two rectangular panels and some degree of structural superiority over a simple butt joint. However, these joints all suffer because they require removing material from the panels being joined and require more time and expense to fabricate than is warranted by many applications. There are also numerous materials for which these techniques are not appropriate.

A traditional method of reinforcing the corners of a wooden structure is with angular metal strips which are placed over the preconstructed joint and then secured in place. This method is flawed for several reasons. First, it requires the structure to be built before it is reinforced. Second, the angular metal strips are only applied to the outside of the box, so the support is limited to one side of the structure. Finally, the metal strips only engage the outer sides of the panel and not the edges or inner sides of the panels.

Bleeck, United Kingdom Patent No. 580,254, discloses a corner reinforcement for box and other constructions. While this reinforcement may be some improvement over other corner connectors, it is limited by the fact that it contacts only one of the panels it is reinforcing on more than one side. The Bleeck connector is also limited by the fact that it is limited to joining panels only at right angles to one another.

There is a need for a corner connector which provides both joining and reinforcement for both of the panels it is interconnecting. There is a further need for a corner connector which can be used to join and reinforce boards at angles other than 90°. There is a further need for a corner connector which engages more than one surface on each panels it is connecting. There is yet a further need for a corner angle connector which does not require any special equipment or preparation to use.

SUMMARY OF THE INVENTION

The present invention is a corner angle connector for use in joining and reinforcing two rectangular panels of a given thickness. The corner angle connector has a pair of connector sidewalls which are oriented at an angle to one another. Rising out of the first connector sidewall is a reinforcing tab which has a pair of reinforcing tab sidewalls. The reinforcing tab sidewalls are parallel to the corner angle connector sidewalls. The reinforcing tab sidewalls form with the connector sidewalls a pair of channels into which rectangular panels can be placed edgewise. The panels are then engaged and supported on both sides and an edge by either a connector sidewall or a reinforcing tab sidewall.

The corner angle connector can be fabricated as one piece out of steel, stamped and then folded into the desired shape. It is also within the scope of the present invention to fabricate the corner angle connector out of plastic, using any number of well known techniques for doing so.

The angle between the two corner connector sidewalls determines the angle at which the rectangular panels will be joined. It is possible to form the corner connector for angles between 60° and 135°.

The corner angle connector can be used in numerous applications. The connectors can be used to join together the various pieces forming a box or bin. They can also be used to create shelving, room dividers, or join together the structural members of a roof, simply by way of further example.

BRIEF DESCRIPTION OF THE DRAWINGS

The invention, together with further advantages thereof, may best be understood by reference to the following description taken in conjunction with the accompanying drawings in which:

FIG. 1 is an isometric view of the multiple tab embodiment of the corner angle of the present invention.

FIG. 2 is a cross-sectional view of the corner angle of the present invention taken along line 2—2 of FIG. 1 and additionally shows how the present invention can be used to join two boards.

FIG. 3 is an isometric view of single tab embodiment of the corner angle of the present invention.

FIG. 4 is a cross-sectional schematic view of the corner angle of the present invention where the angle $\alpha'$ between the connector sidewalls is 120°.

FIG. 5 is a cross-sectional schematic view of the corner angle of the present invention where the angle $\alpha''$ between the connector sidewalls is 135°.

FIG. 6 is a cross-sectional schematic view of the corner angle of the present invention where the angle $\alpha'''$ between the connector sidewalls is 60°.

DETAILED DESCRIPTION OF THE INVENTION

In a preferred embodiment, the present invention is a one piece metal corner connector for structurally interconnecting in angular relation to each other two flat rectangular panels of a given thickness. Referring to FIG. 1, it can be seen that the present invention, referred to generally as corner angle connector 2, is comprised of a first connector sidewall 4 and a second connector sidewall 6 orientated at angle $\alpha$ to said first connector sidewall 4. Angle $\alpha$ can be any angle between 60° and 135°. A reinforcing tab 8 is stamped out of the piece of metal and then bent up so that its first reinforcing tab sidewall 10 is parallel to first connector sidewall 4 and its second reinforcing tab sidewall 12 is parallel to the second connector sidewall 6. Apertures 14 are provided uniformly across the first connector sidewall 4 and the second connector sidewall 6 to allow the use of nails, nuts and bolts, screws, rivets, or adhesive to secure the rectangular panels being joined.

It can be seen in FIG. 2 that the spacing between the first connector sidewall 4 and the first reinforcing tab sidewall 10 is roughly equal to the thickness of rectangular panel 16 that is to be joined. The spacing between second connector sidewall 6 and second reinforcing tab sidewall 12 is also roughly equal to the thickness of rectangular panel 18 which is to be joined via angle connector 2 to rectangular panel 16.

Referring back to FIG. 1, we can see that multiple reinforcing tabs 8 are used to support the rectangular panels to be joined. FIG. 3 illustrates another embodiment of the present invention wherein only a single reinforcing tab 8 is used to make the corner connection and provide the reinforcement of the joint. FIGS. 4 and 5 illustrate other embodiments of the present invention where the angle α between the first connector sidewall and second connector sidewall is in excess of 90°. Either the single, see FIG. 1, or multiple reinforcing, see FIG. 3, tab configuration may be used. In FIG. 4, the angle α is approximately 120°. In FIG. 5, angle α is approximately 135°.

The corner angle connector 2 is not limited to joining two rectangular panels made of wood. It can be used to join wood, particle board, drywall, plastic or any other material which is formed into rectangular panels and requires the formation of corner joints and structural support. Rectangular panels are secured in the corner angle connector by any number of well known methods. The corner angle connector can be formed such that the channels between the connector sidewalls and the reinforcing tab sidewalls are slightly smaller than the rectangular panels to be joined and thereby using compression to join and reinforce the rectangular panels. Nuts and bolts, nails, rivets, or screws may be passed through apertures 14 to secure panel 16 and panel 18 to corner angle connector 2. Metal strapping may be used to bind an assembled box or crate so fabricated. The use of metal strapping precludes the need for providing any other form of fastening to keep the panels from folding inward, which is a common problem with shipping containers when impacted. Thus fabricated, the box or crate would be easily disassembled when no longer necessary. It is also within the scope of the present invention to use an adhesive compatible with the materials being joined to bond both side surfaces of the panels to the corner angle connector.

We claim:

1. In combination, two flat rectangular panels and a one-piece metal corner connector for structurally interconnecting in angular relation to each other said two flat rectangular panels of a given thickness, said connector being of uniform wall thickness throughout, said combination comprising:

(a) a first connector sidewall;

(b) a second connector sidewall oriented at an angle to said first connector sidewall;

(c) a reinforcing tab having a first reinforcing tab sidewall and a second reinforcing tab sidewall, with said first reinforcing tab sidewall and said second reinforcing tab sidewall being formed by cutting and bending the metal of said first connector sidewall and said second connector sidewall, with said first reinforcing tab sidewall parallel to said first connector sidewall and said second reinforcing tab sidewall parallel to said second connector sidewall, with the spacing between said first connector sidewall and said first reinforcing tab sidewall being substantially equal to the given thickness of a first flat rectangular panel, and with the spacing between said second connector sidewall and said second reinforcing tab sidewall being substantially equal to the given thickness of a second flat rectangular panel, said tab sidewalls thereby forming with said connector reinforcing tab sidewalls a pair of channels into which the panels are placeable edgewise with each side face of each said panel in supported engagement with either one of said connector sidewalls or one of said reinforcing tab sidewalls; and (d) said two flat rectangular panels engaged edgewise in the respective channels formed by said connector sidewalls and reinforcing tab sidewalls, and including fastening means between said flat rectangular panels and said connector sidewalls or reinforcing tab sidewalls to maintain contact between the interengaged surfaces thereof.

2. The combination of claim 1, wherein said fastening means is selected from the group consisting of screws, nails, staples, and rivets.

3. The combination according to claim 1, wherein said fastening means comprises adhesive.

4. In combination, two flat rectangular panels and a one-piece corner connector for structurally interconnecting in angular relation to each other said two flat rectangular panels of a given thickness, said connector being of uniform wall thickness throughout, said combination comprising:

(a) a first connector sidewall;

(b) a second connector sidewall oriented at an angle to said first connector sidewall;

(c) a reinforcing tab having a first reinforcing tab sidewall and a second reinforcing tab sidewall, with said first reinforcing tab sidewall and said second reinforcing tab sidewall being formed by cutting and bending the metal of said first connector sidewall and said second connector sidewall, with said first reinforcing tab sidewall parallel to said first connector sidewall and said second reinforcing tab sidewall parallel to said second connector sidewall;

(d) a first flat rectangular panel engaged edgewise in the channel formed by said first connector sidewall and said first reinforcing tab sidewall, and including a fastening means between said first flat rectangular panel and said first connector sidewall or said first reinforcing tab sidewall to maintain contact between the interengaged surfaces thereof; and (e) a second flat rectangular panel engaged edgewise in the channel formed by said second connector sidewall and said second reinforcing tab sidewall, and including a fastening means between said second flat rectangular panel and said second connector sidewall or said second reinforcing tab sidewall to maintain contact between the interengaged surfaces thereof.

5. The combination of claim 4, wherein said fastening means is selected from the group consisting of screws, nails, staples, and rivets.

6. The combination of claim 4, wherein said fastening means comprises adhesive.

* * * * *